United States Patent [19]

Fisher et al.

[11] Patent Number: 5,528,847
[45] Date of Patent: Jun. 25, 1996

[54] VARIABLE POWER TELESCOPIC SIGHT

[76] Inventors: Timothy D. Fisher, R.D. #1, Box 188, N. Milford, Pa. 18834; Timothy G. Oakley, R.D. #1, Box 52E, Thompson, Pa. 18465

[21] Appl. No.: 288,316

[22] Filed: Aug. 10, 1994

Related U.S. Application Data

[63] Continuation-in-part of Ser. No. 18,252, Mar. 28, 1993, abandoned.

[51] Int. Cl.⁶ .................................................. F41G 1/38
[52] U.S. Cl. ................... 42/101; 33/245; 359/421
[58] Field of Search ...................... 42/101, 100; 33/245, 33/246; 359/421

[56] References Cited

U.S. PATENT DOCUMENTS

| | | | |
|---|---|---|---|
| 3,079,833 | 3/1963 | Malinowski | 42/101 |
| 3,340,614 | 9/1967 | Leatherwood | 42/101 |
| 3,492,733 | 2/1970 | Leatherwood | 42/101 |
| 3,724,927 | 4/1973 | Cox | 350/203 |
| 3,826,012 | 7/1974 | Pachmayr | 33/246 |
| 3,979,848 | 9/1976 | Ackerman, Jr. | 33/248 |
| 4,105,282 | 8/1978 | Schael | 356/247 |
| 4,290,219 | 9/1981 | Boller et al. | 42/101 |
| 4,317,304 | 3/1982 | Bass | 33/247 |
| 4,461,087 | 7/1984 | Norman | 33/249 |
| 5,276,554 | 1/1994 | Nassivera | 42/101 |

*Primary Examiner*—Stephen M. Johnson
*Attorney, Agent, or Firm*—Arthur R. Eglington

[57] ABSTRACT

A variable magnification telescopic rifle sighting means includes an externally-located zoom adjusting ring rotatable about sighting means axis and modified to provide a digitally-activated zooming feature, permitting an essentially instantaneous switching over the range of magnification settings. The switching means includes an annular recess on the periphery of the magnification adjusting ring suited to receive on end of a flexible cable. The cable length is adapted to extend and be coupled to a grippable means that can slide longitudinally upon manipulation within a slotted bracket mounted on the rifle stock. A second protective collar embraces the modified magnification ring and has an aperture for control cable translation. The movement of the grippable means through its line of travel via the cable effects a concurrent shifting of the zoom adjustment ring setting.

4 Claims, 3 Drawing Sheets

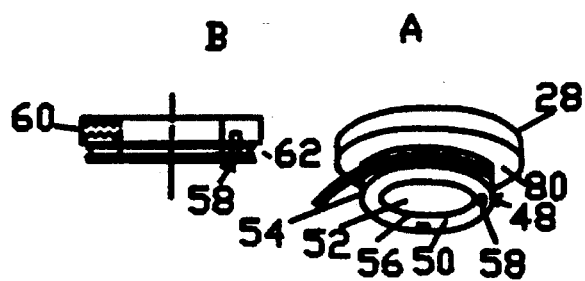
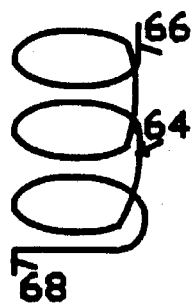
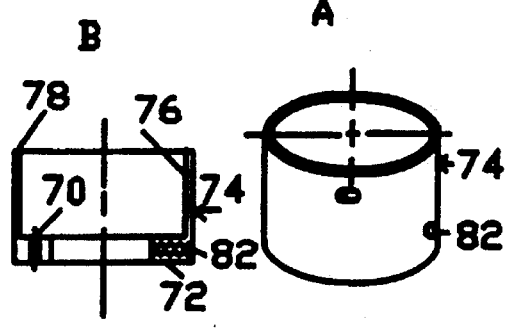
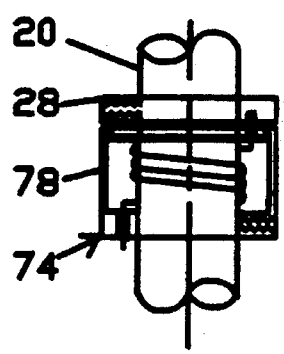
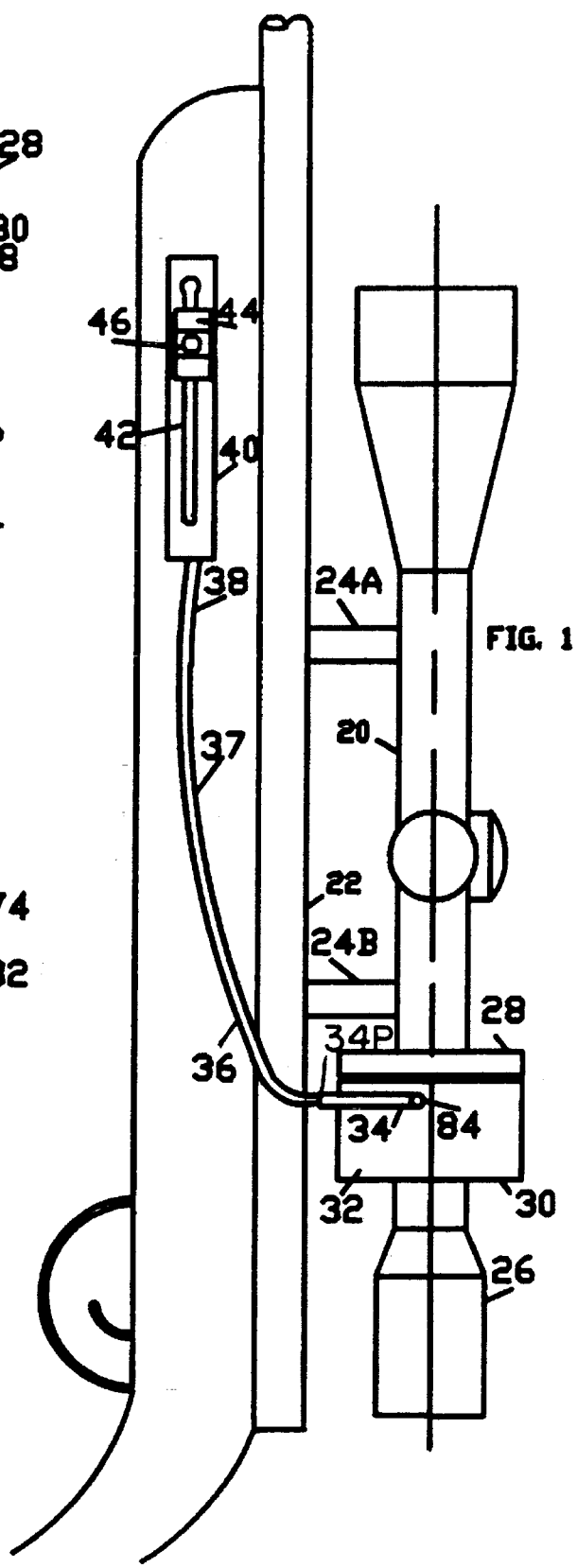

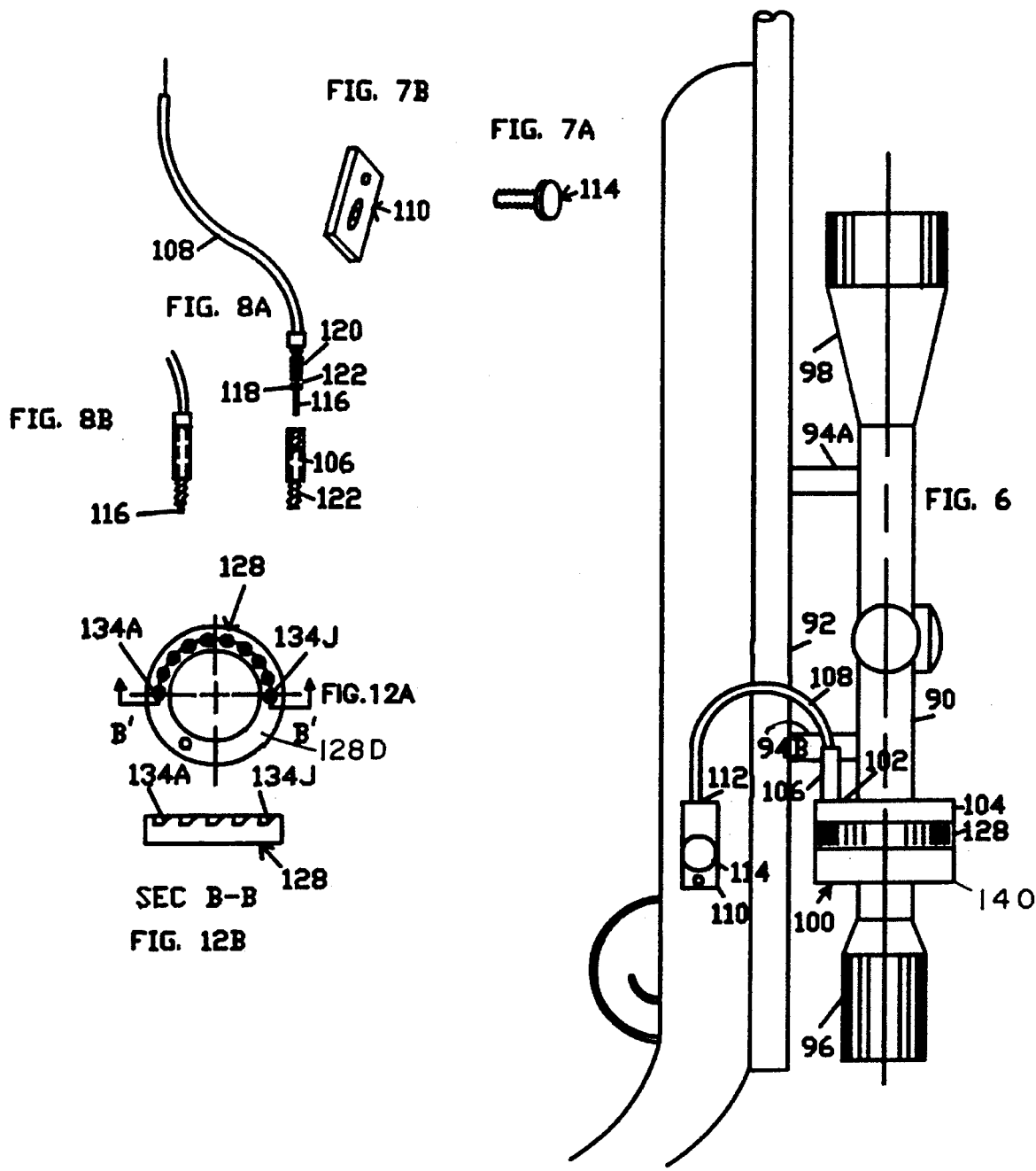

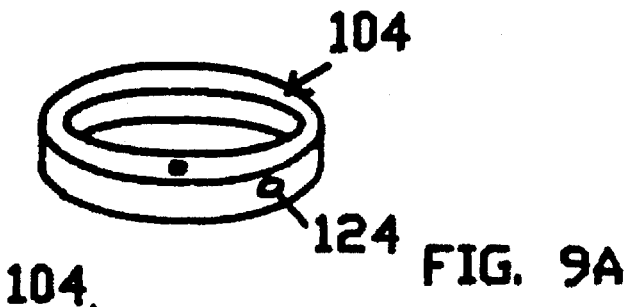
FIG. 9A
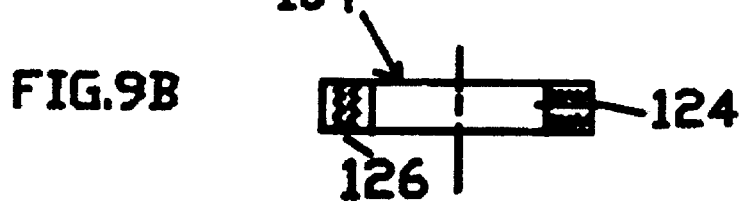
FIG. 9B
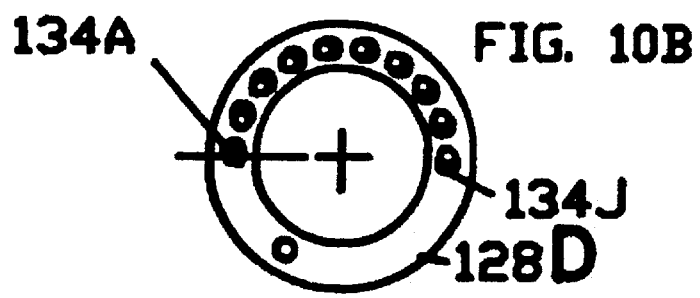
FIG. 10B
FIG. 10A
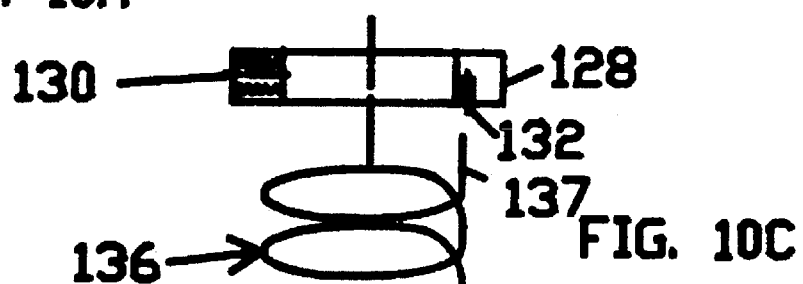
FIG. 10C
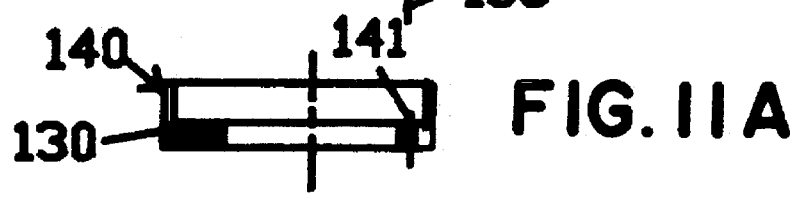
FIG. 11A
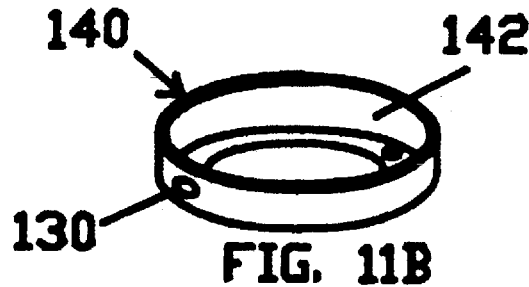
FIG. 11B

VARIABLE POWER TELESCOPIC SIGHT

CROSS REFERENCE TO OTHER APPLICATIONS

This is a continuation-in-part of my application U.S. Ser. No. 08/018,252 of Mar. 28, 1993 now abandoned.

FIELD OF INVENTION

This invention relates generally to adjustable telescopic sighting structures on rifles and particularly to improved magnification means for such sights.

BACKGROUND OF THE INVENTION

This invention relates generally to adjustable gun sight structures, and particularly to improved magnification adjustments for such sights. Various weapons including firearms (rifles in particular) are often equipped with telescopic sights. Such telescopic sights are also provided with adjustment features, whereby the telescope itself may be "zeroed in" at a predetermined range. While variable magnification power rifle scopes have made rifles safer and :more effective, still one cannot increase the magnification power of the scope while simultaneously looking through it. The usual magnification adjustment ring is worked by digital manipulation and is varied through several settings, from minimum magnification (the initial set) to maximum magnification (wanted when a bead is drawn on an apparent target). Internal of the adjustable magnification ring is an enclosed ocular lens, which is adapted to move but slightly and reciprocally, but only within a longitudinal direction which is aligned with the rifle barrel.

Upon prey sighting, the major shortcoming for an alerted hunter is a need for the momentary dishouldering of the rifle so as to access the flat magnification ring which serves as a zoom-adjustment means. This quick act serves to gain a proper degree of magnification of the initially spotted prey animal. Even though such a quick diversion from scope sighting involves but a few seconds, in such a moment, the animal can move or scamper if alerted by others or even by the hunter's weapon movement. Also, failure to completely identify a seeming target can end up in a human tragedy, caused by an overeager hunter reluctant to delay his shot to gain a clearer prey scope silhouette.

It is therefore a principal object of the invention to provide a variable magnification power-type, telescopic rifle sighting means having a digitally-activated, zoom-adjustment means that permits an essentially instantaneous switching from the preset partial magnification to the maximum magnification on sighting a prey, doing so without dishouldering of the rifle and incurring the intended delay seconds needed for manual switching of the zoom.

It is a further object of the invention to provide a simplified construction modifications for available telescopic sights of the variable power type that provides them with the rapid magnification snap switching feature.

It is yet another object of the invention to provide an automatic coupling mechanism between the exterior ring operating a zoom feature, and a release mechanism so that the line of sight (bead) on the target is maintained while still effecting the zoom feature with a deft touch.

SUMMARY OF THE INVENTION

The present invention hurdles the above-described shortcomings of present telescopic sight, magnification adjustment systems, by enabling an alerted hunter to deftly, flip-switch his scope to an optimal or maximum magnification viewing, prior to taking his shot on target. There is provided a variable magnification power-type of telescopic sighting means, including an externally-located zoom adjusting ring which is normally digitally rotatable about the axis of the sighting means, and usually also having a manual high piece focus means (proximal to the hunter's eye).

The disclosed scope presents a digitally activated, zoom-adjustment ring means permitting quick switching over the built-in range of magnification values up to the maximum value of the particular scope sighting means.

In a first embodiment, the conventional zoom-adjustment ring means is modified to include a peripheral annular channel that receives and anchors one longitudinal end of a flexible cable, which cable is adapted to effect a tangential torque (rotational bias) on the zoom ring, in either direction, dependent upon the direction of the axial force exerted on the cable. The elongate cable itself then extends along the rifle stock to a terminal position where it can be pinned to a manual gripping means, which gripping means is adapted to slide, longitudinally and reciprocally, upon digital manipulation, while tracking within a slotted retaining bracket which is permanently mounted on the stock of the rifle. Another chamber-shaped, formed collar is sized to encompass and enclose the ring periphery and its cable channel of the modified ring along their opposing arcuate surfaces, which recessing feature serves to secure the distal moving cable segment from contamination and snagging during field use.

Interposed between the magnification ring and the formed collar is a toroidal spring which is adapted to surround the scope barrel, being tied at its opposing longitudinal ends to the ring and the formed collar periphery. The configuration of such spring effects a tangential torque on the zoom ring, in one direction, moving same to one preselected terminal position. This steady position may be countermanded by the digital manipulation of the stock-mounted gripping means.

The outer collar is further provided with a peripherally-located nipple having a centrally-located, radially-aligned port located therein. This port is adapted to slidingly receive the inner-connected segment of the control cable, whereby upon digital movement of the gripping means along its longitudinal slot, such sliding effects a gradual shifting of the associated zoom-adjustment ring of the target sighting scope from its minimum to its maximum degree of prey magnification.

In an alternate embodiment, the zoom-adjustment ring is modified to include a digitally-activated zoom-adjusting means that permits an essentially instantaneous switching from any one point of the several magnification settings up to the maximum magnification value for that scope. A modified zoom assembly includes an annular-shaped collar mounted rotatable on the sighting means barrel with its periphery adapted to threadingly engage a cable support fitting and internal cable; an adjusting ring modified to present a plurality of shaped recesses arrayed arcuately about the distal planar surface of the ring; each recess being adapted to effect locking pin engagement in one of its rotatable directions and to effect sliding disengagement in the other direction; a second annular-shaped collar is positioned adjacent the proximal surface of the magnification ring and provides a cylindrical recess to nest the spring body and to anchor the one terminal end of a toroidal spring which has its other longitudinal end making peripheral anchoring contact with the magnification ring, so as to normally bias the ring to rotate to one extreme position of its spiral path and to retain same; an external flexible cable has its inner end provided with an axially extending, spring-biased rigid pin adapted to interruptably engage one of the shaped recesses located in the distal surface of the opposing adjusting ring; a gripping means is pinned to the other longitudinal end of the pin-bearing cable which provides the means that can be retracted to withdraw the rigid pin disposed at the other cable end, whereby such step permits the built-in spring bias of the ring to switch essentially at once from its intermediate position to the maximum magnification position.

BRIEF DESCRIPTION OF THE DRAWINGS

FIG. 1 is a left-side elevational view of a first embodiment of a telescopic rifle sighting means developed in accord with the present invention while mounted on the top of a fragmentary rifle barrel;

FIG. 2A is a broken out, perspective view of an annular-shaped, inner collar that is normally pinned to the periphery of the rotatable adjustable range, magnification ring of the telescopic means along with its peripheral cable access nipple;

FIG. 2B is a side elevational view of the collar of FIG. 2A showing the one free end of a central cable pinned within an annular channel of the zoom-control magnification ring;

FIG. 3A is a perspective view of the outer annular-shaped ring which surrounds and slidingly engages the inner collar;

FIG. 3B is a side sectional view of the ring of FIG. 3A which admits of a coaxial cable at one peripheral point;

FIG. 4 is a side perspective view of the toroidal ring component normally nested within the distal surface chamber of the collar of FIG. 3A;

FIG. 5 is a vertical sectional view of the telescopic sighting means of FIG. 1, depicting the components assembled in their functional mode;

FIG. 6 is a left-side elevational view of a second embodiment of a telescopic sighting means of the invention while it is mounted on top of a fragmentary view of a rifle barrel;

FIG. 7 A & B are exploded perspective views of a slidable knob and cooperating set screw normally disposed and pinned at one end of the cable release component of the adjustable range sighting scope;

FIGS. 8A & B are perspective views of the flexible control cable and its other longitudinal end, normally associated with the scope sighting mechanism and depicting same, both as its exploded view and assembled as a terminal, spring-biased, locking pin;

FIGS. 9A & B are a perspective and side elevational sectional view of the distal (first) annular-shaped barrel collar component of the sighting mechanism;

FIG. 10A is a side elevational view, in vertical section of the intermediately located collar of the invention, functioning as a magnification zoom control ring;

FIG. 10B is a front-elevational view of the collar of FIG. 10A (distal surface) depicting the peripherally-arrayed partial arc of surface recesses;

FIG. 10C is a side perspective view of the toroidal spring component normally nested within a distal surface recess 142 of FIG. 11B;

FIG. 11A & B are side elevational and perspective views, respectively, of the most proximally-located annular collar component;

FIG. 12B is an arcuate sectional side elevational view of the collar 128 of FIG. 10B, taken along line B—B in FIG. 12A, depicting the partially serrated periphery of the distal planar surface, which provide for the ratcheting feature for the rotatable magnification ring.

DETAILED DESCRIPTION OF THE PREFERRED EMBODIMENTS

Now with reference first to FIG. 1, there is illustrated a rifle having a telescopic sight 20 mounted on its barrel 22. Sight 20 may be affixed to the barrel in any appropriate manner, as by means of a pair of spaced-apart mounting brackets 24A, 24B, which maintain the "scope" parallel to and fully aligned with the barrel. The scope itself includes an eyepiece 26 including an ocular lens component, and a barrel 20 segment containing the erecting and magnifying lens, assembled for a zoom system (not seen). These features are neither a part of the present invention, nor are illustrated here, being known to the optics art. Such sighting scopes to which the present invention may be readily adapted are depicted, both representationally and diagrammatically, in U.S. Pat. No. 3,492,733 of J. M. Leatherwood to a "Variable Power Sighting Scope."

A manual adjusting ring 28 operates, by means of internal linkage (not shown), the zoom system of the scope, so that the image of the target can be made to quickly appear larger or smaller in proportion to the scope viewing field, as is well known in the art.

Commonly, a projecting knob (not seen) on the adjusting ring 28 facilitates such adjustment. Adjustment ring 28 itself has been modified internally (as will be later described), and externally, to cooperate with an enlarged rigid collar 30 that encompasses and partially overlaps ring 28. Projecting in a tangential alignment from the outer periphery 32 of collar 30 is a formed nipple 34 which is provided with an axial port 34P (FIG. 4). Emerging from nipple 34 is a slidingly engaged, flexible metal cable 36. Cable 36 is conveniently a coaxial cable with a woven wire core moveable within and a protective resilient rubber sheathing. The core and sheathing are adapted to permit longitudinal and reciprocal movement of the metallic core upon the exertion of an axial pressure to the external (free) cable end. The external cable end 38 is inserted lengthwise into a rifle stock-mounted elongate bracket 40.

Bracket 40 is provided with an elongate horizontal slot 42 that retains and displays a projecting stud 44, adapted for digital grasping and controlled movement. The terminal end of cable 38 is aligned within an axial bore hole (not seen) of stud 44, being fixedly secured therein by a radially-aligned, Allen-headed set screw 46. Manual tracking of stud 44 along slot 42 will effect similar movement of its pinned cable 37, to urge the wire core component of cable 37 inwardly or outwardly along the intermediate elongate segment of the sheathing component.

Because of the prior described ring linkage of cable 36 at its opposing longitudinal end (concealed within collar 32), the digital horizontal tracking of gripping stud 44 along slot 42 similarly moves the cable core. This effects a graduated shifting of the associated (pinned) zoom-adjustment ring 28 component of the target sighting means, from its minimum (large viewing field) to its maximum magnification; and vice versa, upon reciprocal movement of gripping stud 44.

Looking to the perspective view of FIG. 2, magnification ring 28, is provided with a reduced-diameter cylinder 48 (proximal side) also presenting a generally planar interface 50 (perforated by tubular chamber 52), sized to engage the barrel of scope 20. This defines a narrow arcuate shoulder 54. Located intermediate of the outer arcuate edge of shoulder 54 and the inner circular tubular edge 56 of cylinder 48 is a transversely-aligned bore hole 58, adapted to receive and retain one free end of a wire means (not seen). At least one radially-aligned tapped bore hole 60 is provided in ring 28 for locking. Also provided in the arcuate surface of cylinder 48 is an annular-shaped recess which is disposed inwardly of the cylindrical shoulder 54. The resulting channel 62 (FIG. 2B) is of sufficient depth and width to receive and secure one end of the flexible cable 37 of FIG. 1, which cable is anchored at that one longitudinal end at a point certain within the annular channel 62.

A toroidal spring 64, is diametrically-sized to be slidingly mounted on scope barrel 20 and having its circular periphery adapted so that its first longitudinal end 66 is anchored in the bore hole 58 of cylinder 48. The spring is oriented upon assembly so as to bias adjustment ring 28 to rotate in a clockwise direction (as viewed from the eyepiece) and similarly, such bias draws external control cable 37 into the magnification adjusting assembly, continuing to the limit of the in-built ring travel, which is to the high or low power end of the scope range.

The other longitudinal end 68 of coiled spring 64 is inserted and then is retained during assembly in a second transverse bore hole 70 (FIG. 3B), provided in the annular-shaped bottom wall 72 of an opposing cylindrical-shaped collar 74 (FIG. 3A). On its distal planar surface, collar 74 presents a large cylindrical chamber 76, sized to accommodate the body of coiled spring 64 (FIG. 4). The inward projecting cylindrical bottom sidewall of collar 74, are adapted for mounting on the scope barrel and via its bottom sidewall aperture to make circular top edge 78 contact with the peripheral planar surface 80 of opposing magnification ring, as depicted in FIG. 5.

On collar 74, there is provided at least one radially-aligned, tapped bore hole 82, adapted to receive an Allen-head type screw (not seen), that will serve to pin same to the scope barrel. It is preferred that three such equispaced, bore holes as 82 be included, thus bearing three set screws which admit of more effective centering of the adjusting ring 28 on the scope barrel 20. Such mode of collar anchoring permits the toroidal spring 64 to exert its torque peripherally only against the coupled magnification ring, in one direction. As seen in FIG. 1, collar 74 itself also has a tangentially-aligned, formed nipple 34 which is provided with an axial port 84. Emerging from the outer nipple port is the flexible metal cable 37, the ring control function of which was earlier described.

When assembled, as depicted in the vertical sectional view of FIG. 5, the digital movement of grippable means 44 (FIG. 1) effects a tensioned but gradual shifting of "zoom" ring 28 across the range of its plural-stop magnifications, away from the initial setting normally held by toroidal spring 64. Manually countering the normal rotational bias of spring 64 serves to cause ring 28 to rotate toward the other extreme position of its spiral travel path, and thus to variably retain such position corresponding to the manually-directed, slot posture of grippable means 44. Normally, the bias of the spring 64 maintains adjustment ring 28 at the preselected terminal position until the grippable shifting means 44 is activated by the hunter.

The internal configuration of the modified zoom-adjustment ring will now be described in relation to FIGS. 2 to 6.

An alternate embodiment of the automatic zoom-adjustment means of the present invention will be detailed in relation to FIGS. 6 to 11. Firstly, with reference to FIG. 6, another telescopic sight 90, mounted on rifle barrel 92 is seen, secured uprightly by spaced-apart vertical brackets 94A, 94B. This scope also includes an eyepiece 96, including an ocular lens component (not seen); with the scope barrel 90, containing the erectors and magnifiers of the zoom system (not seen), and the distal objective lens assembly 98. Proximal to eyepiece 96 is a magnification adjusting ring assembly 100. Projecting horizontally from the external surface 102 of distal collar element 104 of assembly 100 is a formed nipple 106, which admits of a bendable but inelastic (non-compressible) coaxial cable 108. This cable is spaced between the ring assembly 100 and a stock-mounted bracket 110, being somewhat similar in cable control function to the embodiment 40 of FIG. 1.

Rifle-mounted stock bracket 110 is optionally of a rectangular configuration, having a distal vertical side longitudinally-aligned bore hole provided in its narrowest (vertical) dimension (not seen), which port receives the outer longitudinal end 112 of control cable 108. The internal core (braided element) is of a substantially lesser diameter than the core wire of FIG. 1, for reasons to be explained. A stripped terminal end of cable 112 (not seen) is threaded lengthwise through bracket 110 and is pinned within a conventional sleeve, floating lengthwise therein (not seen).

An externally accessible thumbscrew 114 has an inwardly-pointing projection (not seen) that compresses and engages the end cable sleeve. Thumbscrew 114 is adapted to limited lateral movement with its support bracket 110, but is such that any slight rightward movement of it, shifts the associated cable slightly with the following effect.

At the opposing longitudinal end of the cable 108 is located and mounted axially an outwardly projecting lock pin 11.6 (FIG. 8A). Pin 116 has an intermediate projecting flange 118 that retains one end of a small, compressed toroidal spring 120, mounted on the inward shaft of the pin. The inner end of pin 116 is tied to the axial cable core end 122. The outward bias of pin 116 can be overcome when a force is remotely exerted on cable 108 at its opposing external end, usually by the slight shifting of knurled knob 114 rearward. The temporary pin retraction permits a motive, rotational action of the adjustment ring assembly 100, to be described.

Projecting nipple 106 of FIG. 6 is alternately presented in FIG. 8A to show its concealed functional elements. The proximal end of nipple 106 is reduced and threaded so it may be rotatably inserted and locked into collar 104 of FIG. 9. The mating nipple provides for a convenient means of mating and calibrating its enclosed lock pin 116, which will interruptably engage the distal surface of planar magnification ring 128.

Formed annular shaped collar 104 (FIG. 9) slides on barrel 90 of the scope. It is provided with one or more peripherally-located, spaced-apart bore holes, like 124, all aligned radially, that are tapped to admit an Allen-headed locking nut (not seen). A single and offset transverse bore hole 126 is adapted to threadingly engage the reduced diameter proximal end segment of support nipple 106, for translation of retractable pin 116 (FIG. 8A/B).

Abutting and closely spaced apart to distal collar 104 is a modified, magnification adjustment ring 128 of assembly 100 of the invention. In the vertical sectional view of FIG. 10A, a radial bore hole 130 is provided and tapped to admit of a locking nut (not seen) which will pin this ring to the internal zoom mechanism. A lower surface transverse bore hole 132 is provided and tapped to receive and retain one free end of a wire means. The distal planar anti annular surface 128D (distal from the eyepiece) is provided with an equispaced, peripheral array of countersunk recesses, like 134A–J (FIG. 10B).

These beveled side recesses serve to engage the projecting lock pin 116 of FIG. 8B in a holding mode, until that pin is partially retracted from one particular recess, permitting the magnification ring 128 to rotate counter-clockwise, while the pin is so withdrawn. The ring usually turns to the limit of its travel, which may correspond to the maximum magnification setting of the coupled zoom lens. It is the selectively beveled lateral sidewalls of each recess which permit this spontaneous ring rotation. The arcuate sectional view of FIG. 12B, taken along line B—B of FIG. 12A, better depicts the special configuration of the peg holes which engage pin 116, and reveals how the ring can rotate quickly away from the partly retracted pin.

The bias itself toward unidirectional ring rotation is provided by the adjacent coil spring 136, the lower free end 138 of which is pinned to the adjacent second retaining collar 140 element of assembly 100 of FIG. 11. The perspective view of FIG. 11B shows one of the peripherally-spaced, radially-aligned bore holes, like 130, which are tapped to admit of standard locking nuts; these serve to pin this retaining collar to the scope barrel, and to arrest any axial shifting of ring 128. The proximal planar surface (upper) of collar 140 is provided with a countersunk, flat cylindrical chamber 142, normally adapted to receive and anchor a large toroidal spring 136 (FIG. 10C). Thusly, collar 140 presents a thin walled chamber 142 for retaining coiled spring 136, and incidentally also serving to resist axial movement of magnification ring 128 due to associated coiled spring mechanical pressures. Transverse borehole 141 is provided in the bottom wall to receive and retain the other free end 138 of spring 136.

In operation, a rifleman presets the magnification adjusting ring to any one of the intermediate, or to the lowest, magnification setting, usually the latter, in order to start out with the largest visual field for the scope, upon his spotting of an apparent target animal. Upon drawing a bead on a seeming target, but wishing for a quickly magnified view, his stock support hand, usually the left, (while the other one is curled about the trigger) inches towards knob 114, slightly pressing same laterally, to withdrawn the lock pin 116. This pin release permits almost instantaneous rotation of the spring biased adjustment ring 128 to its maximum magnification setting, without disshouldering of the rifle.

Upon completing his shot upon target, or upon reverting to the stalking mode, the hunter manually resets the magnification ring to any of the other intermediate settings. The special configuration of the peg-like holes, like 134A, and the calibrated torque of the biasing spring 136 permit this to be done with only minimal manual pressure, and with a ratcheting-like rotation.

For a choice of cable core wire 122 of FIG. 8A, a spring steel wire, known as music wire specification, of the Malin Company of Brookpark, Ohio, 44142, has been found useful for serving as the coiled wire of FIG. 10C.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

We claim:
1. In a variable magnification power-type telescopic rifle sighting means fixedly and longitudinally mounted upon a rifle barrel, including an externally-located, zoom adjustment means which is normally digitally rotatable about the longitudinal axis of the sighting means itself and also having a rear proximal lens focusing means provided therein, there is provided a digitally-activated, improved configuration for said zoom-adjustment means including a built-in range of plural magnification settings, and further adapted to permit an essentially instantaneous switch from a first intermediate setting up to the inherent maximum magnification setting for the said sighting means, comprising:

(a) a first annular collar sized to abut slidingly an opposing distal first planar surface of an adjacent magnification adjusting ring and thereby to preclude shifting axial movement of said ring, said first collar having a single peripheral bore hole located transversely between its annulus-shaped, distal and planar surfaces and said hole being adapted to threadingly engage a cable support fitting;

(b) a circular, disc-shaped configuration for said magnification adjusting ring which is located adjacent said first collar having an enlarged axial passage providing an annular periphery on said ring, and said ring presenting a plurality of oval-shaped, recesses arrayed arcuately along said annular periphery of a distal first planar surface of the ring, with each said recess having a beveled configuration on one recess side wall, each of which is adapted to effect locking engagement in one rotatable direction of the ring, and also adapted to effect sliding disengagement in the opposing rotatable direction of said ring;

(c) a second annular collar located and sized to abut slidingly an opposing and proximal second planar surface of the magnification adjusting ring and serving to preclude axial shifting thereof upon digital activation;

(d) a disc-shaped, cylindrical chamber centrally provided in a distal first planar surface of the second collar;

(e) a toroidal spring coiled and located within the said second collar cylindrical chamber, having one longitudinal end anchored therein and having its other longitudinal end making peripheral anchoring contact with the magnification-adjusting ring in a fixed manner, so as to normally bias said ring to rotate to one extreme position of its rotational travel path and to then retain such position;

(f) a flexible cable which at its inner longitudinal end is provided with an axially-rigid pin means that is spring-biased to project outwardly of one of the proximal planar surface of the first collar and which pin serves to interruptably engage one of the oval-shaped recesses located in the first planar distal surface of the abutting adjusting ring; and (g) a gripping means that is pinned to the other longitudinal end of the said flexible cable which gripping means also provides a digitally graspable knob means that can be slidingly retracted, serving to withdraw said rigid pin means disposed at the other cable longitudinal end from locking engagement with the abutting adjusting ring, whereby upon effecting the digital sliding of the gripping means and its partial shifting in one direction, such action disengages said rigid pin means, permitting the toroidal spring-imposed rotational bias of the adjusting ring to switch essentially instantaneously from a first intermediate setting to the maximum magnification setting, and retaining such second maximum setting until the adjusting ring is manually reset to a third intermediate setting.

2. The digitally-activated, zoom-adjustment means of claim 1 in which the annular-shaped planar surfaces of the magnification adjustment ring is provided with a single peripheral bore hole located transversely of said planar surfaces, which is adapted to receive the other distal longitudinal end of the said toroidal spring.

3. The zoom-adjustment means of claim 1 in which a single bore hole is located near the periphery of the second annular collar and lies transversely of its bottom wall and which is adapted to receive one proximal longitudinal end of said toroidal spring.

4. The zoom-adjustment means of claim 1 in which the distal first planar surface of the first annular collar is provided with a peripheral nipple, projecting horizontally from said distal surface thereof, said nipple having an axial bore hole serving as a passage for said flexible cable, which passage slidingly receives the said flexible cable that operably interconnects the longitudinal ends of said cable running between the said oval-shaped recesses located in the magnification adjustment ring at its proximal end and to the stock-mounted gripping means at its distal end.

* * * * *